(No Model.)
H. GERKEN.
Chamber Pail.
No. 233,669.  Patented Oct. 26, 1880.
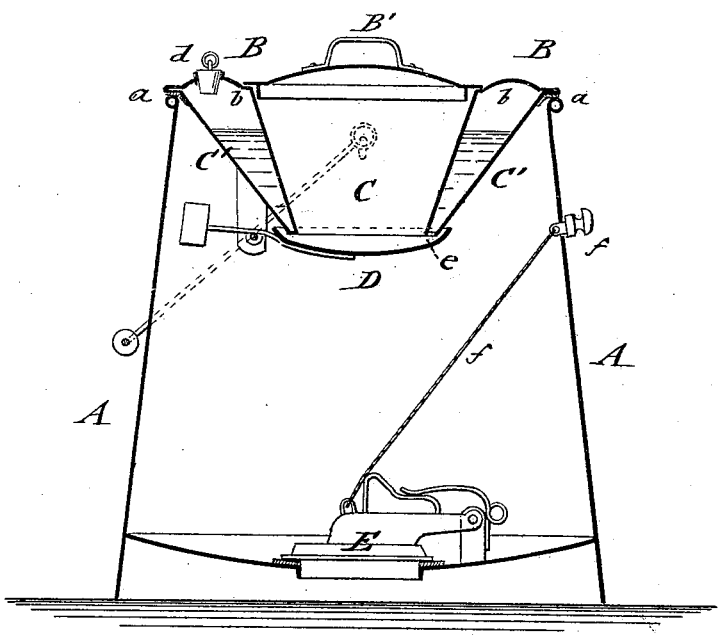
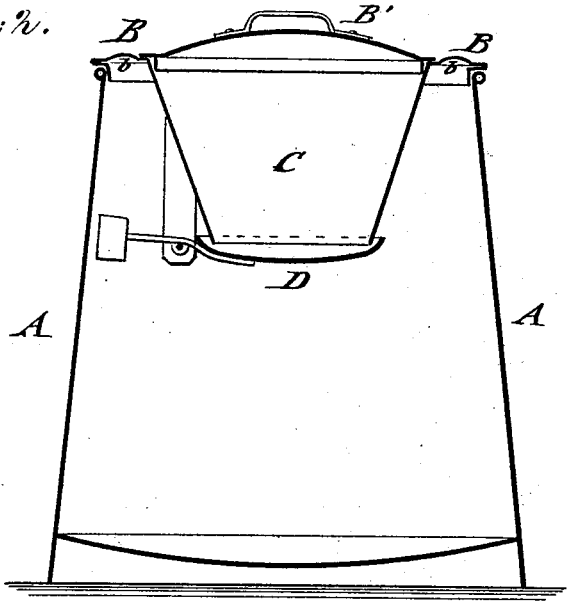
WITNESSES:
Carl Harp
Otto Risch
INVENTOR
Heinrich Gerken
BY Paul Goepel
ATTORNEY

UNITED STATES PATENT OFFICE.

HEINRICH GERKEN, OF NEW YORK, N. Y.

CHAMBER-PAIL.

SPECIFICATION forming part of Letters Patent No. 233,669, dated October 26, 1880.

Application filed August 27, 1880. (No model.)

*To all whom it may concern:*

Be it known that I, HEINRICH GERKEN, of the city, county, and State of New York, have invented certain new and useful Improvements in Chamber-Pails, of which the following is a specification.

This invention has reference to an improved odorless chamber-pail; and it consists of a pail provided with a tightly-closing lid having a tapering downwardly-extending receiver, which is closed at the upper end by a removable lid and at the lower end by a gravity-valve. Around the receiver of the lid is arranged an annular reservoir with a plugged supply-opening and a small discharge-orifice near the lower edge of the cone for a suitable disinfectant solution. The concave bottom of the pail is provided with a central opening that is closed by a spring-acted valve, which is opened by suitable mechanism when it is desired to empty the pail.

In the accompanying drawings, Figures 1 and 2 represent vertical central sections of my improved chamber-pail, Fig. 1 showing the construction of the receiver of the lid with a reservoir for a disinfectant solution, while Fig. 2 shows the receiver without a reservoir for the disinfectant.

Similar letters of reference indicate corresponding parts.

A in the drawings represents a chamber-pail of suitable size, which is preferably made of sheet metal, and B is the lid of the same, which is tightly fitted at its top rim by a rubber gasket, *a*. From the convex top rim, *b*, of the lid B extends downward a conical receiver, C, which is closed at the lower part by a fulcrumed and weighted gravity-valve, D, and closed at the top by a detachable lid, B'. The conical receiver C of the lid is surrounded by an annular tapering reservoir, C', which is charged through a top opening, *d*, with a suitable disinfectant solution, the opening *d* being closed by a screw-cap, rubber plug, or otherwise. The disinfectant solution escapes through a small discharge-opening, *e*, at the lower end of the reservoir onto the gravity-valve D whenever the same has been lowered by the weight of the liquid filled into the receiver, the suction of the liquid causing the escape of a small portion of the disinfectant, sufficient, however, to neutralize the smell of the contents of the pail.

The bottom of the pail is provided with a vertical opening, which is closed by a spring-acted valve, E, which valve is opened by a handle and wire cord, *f*, as shown in Fig. 2, or by a lever or other suitable mechanism. When the valve is opened the contents of the pail are discharged through the bottom opening without removing the lid and top cone. The bottom valve is lined with rubber, so as to secure the tight closing of the bottom opening.

The chamber-pail may also be constructed in a simpler modified form without the annular reservoir around the receiver of the lid, if desired, as shown in Fig. 2. The receiver and top rim furnish, in either case, the advantage that the pail may be also used by children as a common chamber, in which case the contents are directly discharged into the pail and inclosed in the same in a hermetical and odorless manner, forming thus a superior pail for hotel and family purposes.

Having thus described my invention, I claim as new and desire to secure by Letters Patent—

1. The combination, with a chamber-pail, of a tightly-fitting lid having a downwardly-extending receiver with a top lid and a bottom gravity-valve, substantially as set forth.

2. The combination, with a chamber-pail, of an annular lid having a downwardly-extending receiver closed by a top lid and bottom gravity-valve, and provided with an annular encircling-reservoir for a disinfectant solution, substantially as set forth.

3. In a chamber-pail, a top portion having a downwardly-extending receiver closed by a top lid and bottom gravity-valve, and an encircling reservoir having a plugged supply-opening and a bottom discharge-orifice, all as described.

4. The combination, with a chamber-pail having a bottom opening, of a spring-pressed valve and mechanism, substantially as described, for opening the valve and discharging the contents of the pail, as and for the purpose specified.

In testimony that I claim the foregoing as my invention I have signed my name, in presence of two witnesses, this 26th day of August, 1880.

HEINRICH GERKEN.

Witnesses:
PAUL GOEPEL,
CARL KARP.